(12) United States Patent
Homewood et al.

(10) Patent No.: US 7,769,922 B2
(45) Date of Patent: Aug. 3, 2010

(54) PROCESSING SYSTEM STREAMING DATA HANDLING SYSTEM AND STREAM REGISTER

(75) Inventors: Mark Owen Homewood, Winscombe (GB); Antonio Maria Borneo, Matera (IT)

(73) Assignee: STMicroelectronics (R&D) Ltd., Buckinghamshire (GB)

( * ) Notice: Subject to any disclaimer, the term of this patent is extended or adjusted under 35 U.S.C. 154(b) by 161 days.

(21) Appl. No.: 10/697,996

(22) Filed: Oct. 30, 2003

(65) Prior Publication Data
US 2004/0139250 A1    Jul. 15, 2004

(30) Foreign Application Priority Data
Nov. 1, 2002    (EP)    .................................. 02257603

(51) Int. Cl.
*G06F 3/00*    (2006.01)
(52) U.S. Cl. .............................. 710/52; 710/56; 710/58; 710/107
(58) Field of Classification Search ................... 710/52, 710/107, 58
See application file for complete search history.

(56) References Cited

U.S. PATENT DOCUMENTS

| | | | | |
|---|---|---|---|---|
| 4,852,127 A | | 7/1989 | Fraser et al. | |
| 5,420,998 A | * | 5/1995 | Horning | 711/113 |
| 5,797,043 A | * | 8/1998 | Lewis et al. | 710/56 |
| 5,867,733 A | * | 2/1999 | Meyer | 710/74 |
| 5,867,735 A | * | 2/1999 | Zuravleff et al. | 710/52 |
| 6,044,225 A | * | 3/2000 | Spencer et al. | 710/52 |
| 6,434,649 B1 | * | 8/2002 | Baker et al. | 710/107 |

FOREIGN PATENT DOCUMENTS

| | | |
|---|---|---|
| EP | 0558208 A2 | 9/1993 |
| EP | 0663774 A2 | 7/1995 |

* cited by examiner

*Primary Examiner*—Ilwoo Park
*Assistant Examiner*—Aurangzeb Hassan
(74) *Attorney, Agent, or Firm*—Lisa K. Jorgenson; James H. Morris; Wolf, Greenfield & Sacks, P.C.

(57) ABSTRACT

A processing system for accessing first and second data types. The first data type is data supplied from a peripheral and the second data type is randomly accessible data held in a data memory. The processing system includes: a processor for executing instructions; a stream register unit connected to supply data from the peripheral to the processor; and a FIFO. The FIFO is connected to receive data from the peripheral and connected to the stream register unit by a communication path, along which the received data can be supplied from the FIFO to the stream register unit. The Processing system also includes a memory bus connected between the data memory and the processor, across which the processor can access the randomly accessible data.

26 Claims, 5 Drawing Sheets

PROCESSING SYSTEM STREAMING DATA HANDLING SYSTEM AND STREAM REGISTER

BACKGROUND OF THE INVENTION

Field of the Invention

The present invention relates to a processing system, a data handling system and a stream register, which are in particular but not exclusively for use with a peripheral device.

It is known in the art to provide a system including a processor, such as a Central Processing Unit (CPU) that is capable of running a computer program. During running of the program, it is likely that data will be required by the program from a number of sources. It is usual for the majority of the required data to be obtained from the main memory of the system via a memory bus. It is also common for some data to be required from one or more peripheral devices, connected to the CPU via a memory bus.

In order for the CPU to obtain data from a peripheral device, a request signal is sent to the memory bus. The signal then passes from the bus to the peripheral device, wherein the requested data is retrieved from the peripheral device and sent, via the memory bus, to the CPU.

One problem with the known system is that the peripheral device may not have the necessary data exactly when requested. In which case, for correct operation, the peripheral must stall returning of the data accessed until the data is available. During this delay, which may be highly variable, or in the case of a fault, indefinite, the CPU is unable to proceed with any processing, particularly of pending interrupts, until the correct data is returned. It would be desirable to provide a system capable of processing interrupts in a short and determinate time.

Another problem is that if the delay is indefinite, it is inconvenient for the user of the system, since in order to recover the entire system must be reset. One way of avoiding this is to include polling loops in the program code at each point in the code where data from the peripheral device is requested, but the problem with this is that it makes coding more complicated and slows down the rate at which data can be read. In addition, while the CPU is actively polling the peripheral, it is using both memory bus bandwidth and power.

It would be desirable to mitigate the problems of the known system.

According to a first aspect of the present invention there is provided a processing system for accessing first and second data types, the first data type being data supplied from a peripheral and the second data type being randomly accessible data held in a data memory, the processing system comprising: a processor for executing instructions; a stream register unit connected to supply data from the peripheral to the processor; a FIFO connected to receive data from the peripheral and connected to the stream register unit by a communication path, along which the said data can be supplied from the FIFO to the stream register unit; and a memory bus connected between the data memory and the processor, across which the processor can access the randomly accessible data.

According to a second aspect of the present invention, there is provided a streaming data handling system, comprising: a processor; a stream register associated with the processor; a FIFO memory connected to the processor via the stream register, wherein the stream register and the FIFO operate the same data handling protocol such that the stream register can receive streamed data items from the FIFO memory and supply them to the processor in the received order.

According to a third aspect of the present invention, there is provided a stream register connectable between a processor and a peripheral, the stream register comprising: a receiver arranged to receive a request for a data item from the processor; and a stream engine, arranged to send the request to the peripheral and receive one or more signals back from the peripheral indicating availability of the requested data item, and, if the data item is available, send the data item to the processor and if the data item is not available, send a timeout signal to the processor.

According to a fourth aspect of the present invention, there is provided a stream register connectable between a processor and a peripheral, the stream register comprising: a receiver arranged to receive a request for a data item from the processor; and a stream engine, arranged to send the request to the peripheral and receive one or more signals back from the peripheral indicating availability of the requested data item, and, if the data item is available, send the data item to the processor and if the data item is not available, send a stall signal to the processor.

Embodiments of the invention will now be described, by way of example only, with reference to the accompanying drawings in which.

In the figures like reference numerals indicate like parts.

Figure 1:
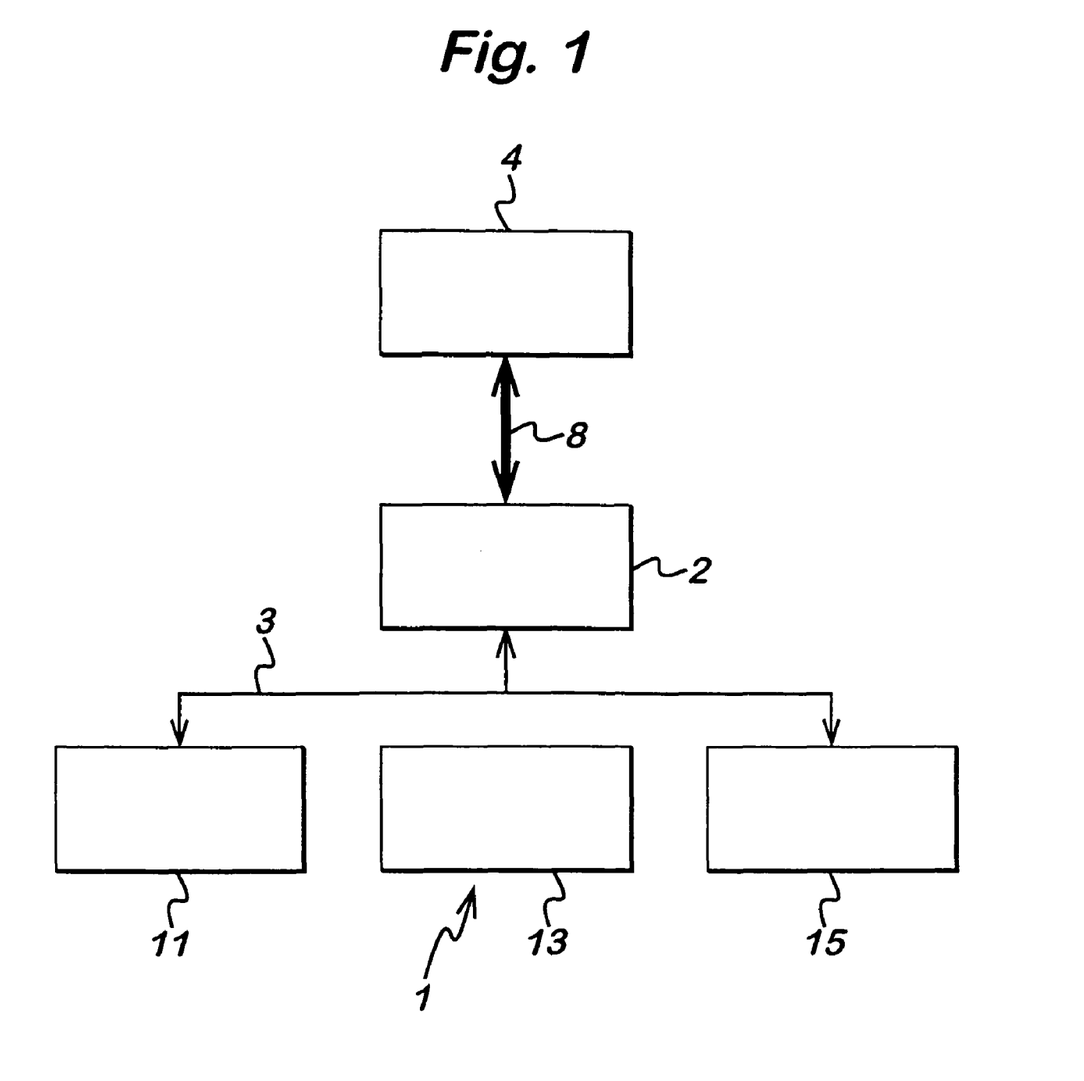
FIG. 1 shows a processing system in accordance with a first embodiment.

Referring firstly to FIG. 1, there is shown a system, indicated generally by reference numeral 1. The system comprises a CPU 2 connected to a memory bus 3. Connected to the memory bus 3 are each of a main memory 11, a first peripheral device 13 and a second peripheral device 15.

The CPU 2 is additionally connected directly to a third peripheral device, which in this case is a video decoder (VDC) 4, via a communication channel 8.

Figure 2:
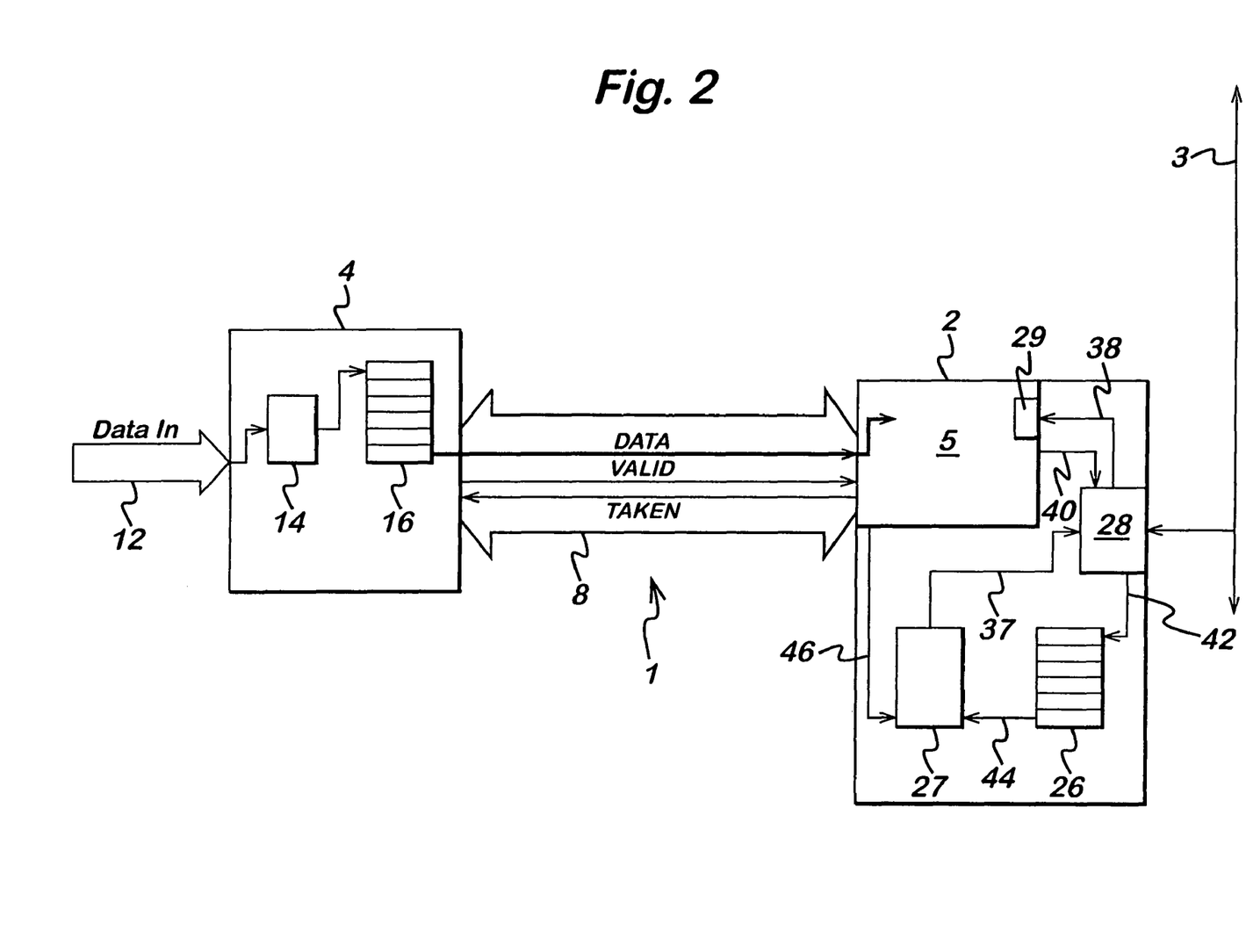
FIG. 2 shows part of the system of FIG. 1.

Turning now to FIG. 2, a detail of part of the system 1 of FIG. 1 is shown. The CPU 2, the memory bus 3, the communication channel 8, and the VDC 4 are visible. The VDC 4 receives video data in at arrow 12 from an external source such as a satellite transmitter. The CPU 2 has a stream register unit 5, a register file 26 containing a plurality of registers, a load/store unit 28 and an execution unit 27 which runs programs. The stream register unit 5 provides the data required by the execution unit 27 from the VDC 4. It has a receiver 29 for receiving requests for data from the execution unit 27.

The VDC 4 comprises a source process 14 to which the video data coming in passes. This source process 14 is connected to issue data to a "first-in-first-out" (FIFO) memory 16. The channel 8 is specifically connected to the VDC 4 at the FIFO 16.

In operation, the execution unit 27 of the CPU 2 runs a program, which it retrieves from the main memory 11 as code in the form of a list of instructions. Many of those instructions require data from the main memory 11, to be retrieved in a known manner. However, some instructions require video data from the VDC 4. In this embodiment, the stream register unit 5 of the CPU 2 receives data from the VDC 4 without the need to go via the bus 3. It does need to send requests for data through the communication channel 8 but this channel 8 is merely a data transfer medium.

The channel 8 works by communicating data in order, i.e. the n-th data item communicated will arrive after the (n−1)th item and before the (n+1)th data item. Thus the execution unit 27 makes n requests for n items of data and these requests are passed in the requested order over the channel 8 and the data is retrieved from the FIFO 16 of the VDC 4 and returned to the CPU 2 in that order. This process makes use of the standard "data", "valid" and "taken" signals used by FIFOs (the taken and valid signals are sometimes known as "request" and "grant" signals). This process is explained in the following paragraphs with reference to an item of data.

The execution unit 27 makes a request for an item of data to the load/store unit 28 (arrow 37). This request is directed to a receiver 29 of the stream register unit 5 (arrow 38). If the stream register unit 5 contains data this is returned to the load/store unit 28 (arrow 40), which temporarily stores the data in the register file 26 (arrow 42), from where it is retrieved by the execution unit 27 (arrow 44). If no data is available a stall signal is sent from the stream register unit 5 to the execution unit 27 (arrow 46), and the execution unit 27 stalls pending data appearing in the stream register unit 5.

If the stream register unit 5 contains no data, the "request" (or "taken") signal is put to logic high across the communication channel 8 from the stream register unit 5 to the VDC FIFO 16. If the "grant" (or "valid") signal from the VDC FIFO 16 to the stream register unit 5 is in response set to logic high at the same time, data is transferred from the FIFO 16 to the stream register unit 5. In this way the next item in the FIFO 16 at the end of the communication channel 8 is transferred to the stream register unit 5, and thus video data is transferred from the VDC 4 to the stream register unit 5, ready for reading by the execution unit 27.

Since data needs to be received externally by the VDC 4 and processed in the source process 14 before being transferred to the FIFO 16 and hence being made available to be sent to the CPU 2, there is a danger that there may be a delay between the execution unit 27 of the CPU 2 requesting the data and it being available. Thus if the data item requested by the execution unit 27 is not in the next location of the FIFO 16, the FIFO 16 returns a valid signal low, to indicate to the CPU 2 that the data item is not there and in this case the data signal does not contain the data item. In this situation, because of the requirement to retrieve data in order, the data request and retrieve process is stopped and the execution unit 27 of the CPU 2 consequently stalls.

Often, the data item will become available in a small number of clock cycles. When this happens, the valid signal is switched high and the data is sent to the CPU 2. The execution unit 27 of the CPU 2 can then carry on running the program. Since the execution unit 27 of the CPU 2 stalls when data is not available and does not take different data from the FIFO 16, no data can be lost from the system 1, and no complicated software is required because everything is controlled by the stream register block 5. Furthermore, since the CPU 2 connects directly to the FIFO 16, data can be input to the CPU 2 without the need for slow accesses across a memory bus. This method automatically deals with flow control.

Figure 2A:
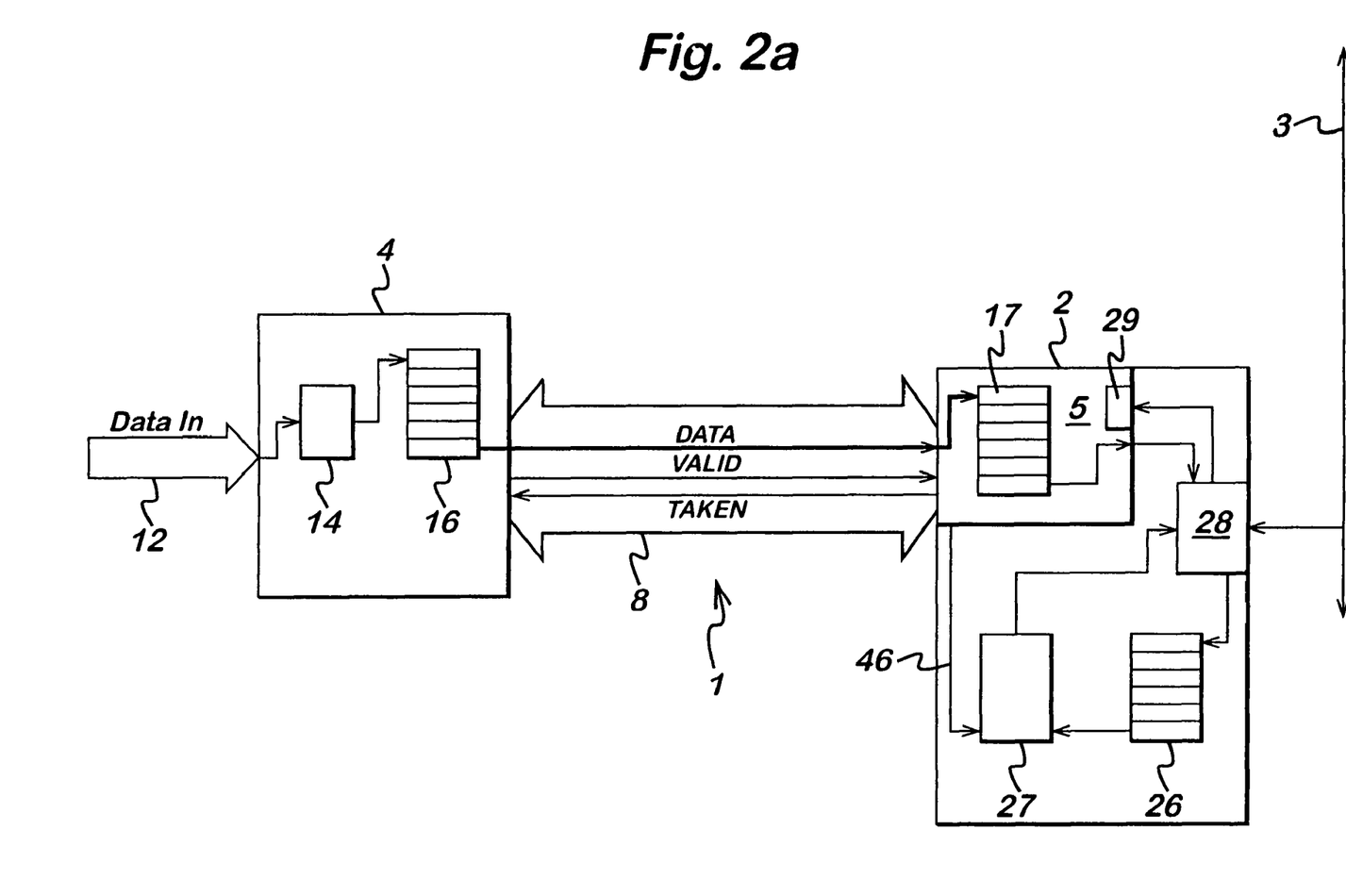
FIG. 2a shows a slightly modified version of the part of the system shown in FIG. 2

Reference is now made to FIG. 2a. To improve the flow of data through the system, the stream register unit 5 can also contain a small FIFO 17. The taken signal is set to logic high across the communication channel 8 while the stream register FIFO 17 is not full. This allows data to be taken at a higher rate from the stream register unit 5. Furthermore data may be taken from the stream register unit 5 for use by the execution unit 27 at a slightly different rate from that at which it is being transmitted to the VDC 4, the combination of the VDC FIFO 16, communications channel 8 and stream register FIFO 17 allowing these communications to flow smoothly.

The stream register unit 5 in this embodiment has a 32 bit wide port, but it could have a different data width should that be appropriate. However, the data passing through the channel 8 does not need to have this same data width. For example, in this embodiment the VDC 4 peripheral stores 16 bit data items, therefore data is sent to the CPU 2 as single 16 bit items. A pair of 16 bit values could be written as a packed word, which would be twice as fast.

Whilst the system of FIGS. 1, 2 and 2a is advantageous in that it is simple, avoids the need for complicated software and provides an improvement in the speed of returning data to the CPU 2 over some known systems, it can suffer from a couple of disadvantages. Firstly, if a data item requested by the execution unit 27 of the CPU 2 does not become available during a large number of clock cycles, say about ten thousand, there is a risk that such an excessive delay will eventually result in irrecoverable stalling of the execution unit of the CPU 2, due to there being no control mechanism to deal with this situation. This would result in the user of the system needing to switch the CPU 2 off and on again to allow the CPU 2 to reset. Another consideration is that there is no mechanism for signalling an interrupt to the execution unit 27 of the CPU 2 while it is stalled. If an interrupt were able to be signalled by a timeout mechanism, it would allow the execution unit 27 of the CPU 2 to perform other tasks while it waited for the missing data item, which would increase overall efficiency of the system 1. To deal with these issues, a second embodiment, is shown in FIG. 3.

Figure 3:
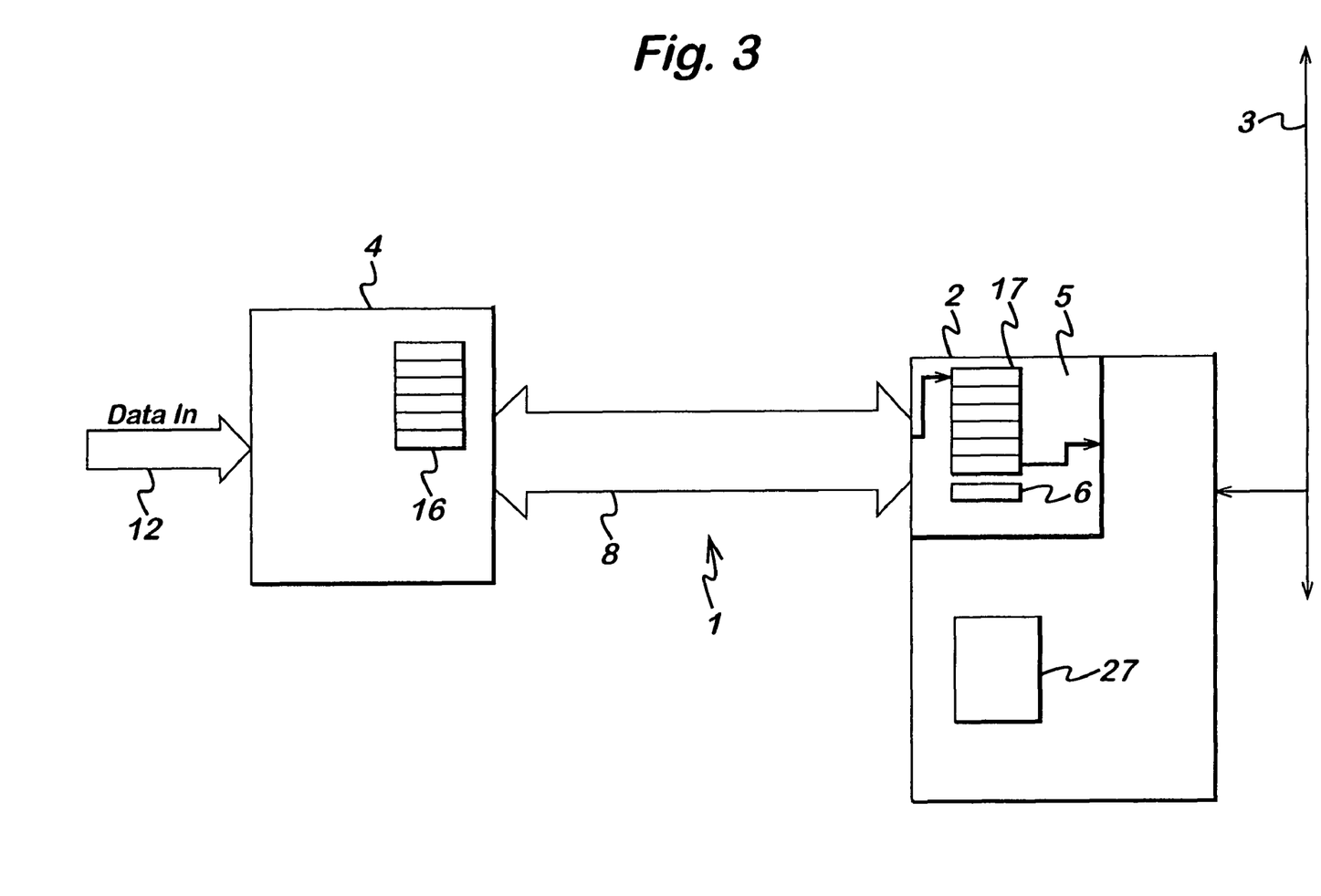
FIG. 3 shows the part of the system of FIG. 2a, modified in accordance with a second embodiment.

FIG. 3 shows the equivalent part of the system 1 as is shown in FIG. 2, but including additionally a timeout generator 6 within the stream register unit 5. The timeout generator 6 detects the situation when the execution unit 27 of the CPU 2 is stalled awaiting a data item to be received from the communication channel 8 and the stream register FIFO 17 is empty for a programmable prolonged period. This raises a TIMEOUT signal which causes the execution unit 27 to stop attempting to receive data from the stream register unit 5 and to start execution of an exception handler dedicated to the stream register unit 5 timeout process. This exception handler means that the application of a system reset can be avoided since any possible deadlock associated with the interface is detected by the exception handler.

Furthermore, since the control of communications with the VDC 4 is entirely contained within the stream register unit 5, it can be arranged that a stall associated with an access to the stream register unit 5 by the execution unit 27 can be interrupted by another requestor other than the stream register unit 5 without altering the stream register state between the execution unit 27 and the stream register unit 5. Therefore another requestor can raise a timeout signal, allowing the execution unit 27 to perform other tasks during a stall caused by lack of data availability in the stream register unit 5.

The signalling involved in execution of the second embodiment will now be described with reference to FIG. 4.

Figure 4:
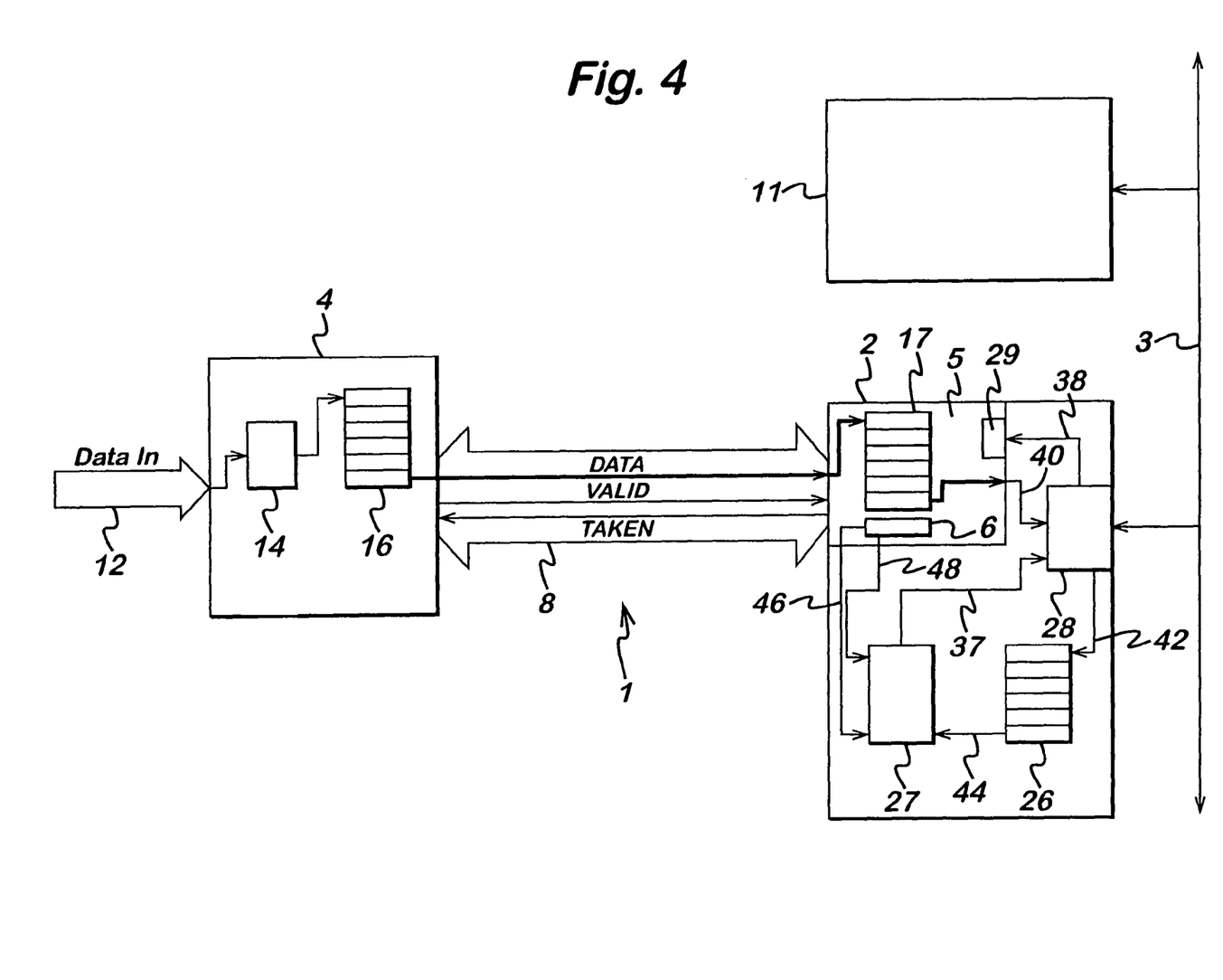
FIG. 4 shows part of the system modified in accordance with the second embodiment.

FIG. 4 shows some components of the system 1 used in the second embodiment. The channel 8 is shown connected to the VDC 4 and to the CPU 2 as before. This channel 8 is used to receive and process the data, valid and taken signals described above. The CPU 2 contains the stream register unit 5, the register file 26, the load/store unit 28 and the execution unit 27. The CPU 2 is additionally shown to be connected to the main memory 11 via the memory bus 3. The execution unit 27 makes requests for data via the load/store unit 28 from either the main memory 11 via the memory bus 3, peripherals such as first and second peripherals 14, 15 via the memory bus 3 (see FIG. 1), or peripherals such as the VDC 4 connected to the stream register unit 5. These requests are placed in the register file 26 for use by the execution unit 27.

In operation, as before, the execution unit 27 makes a request for n items of data, via the load/store unit 28 (arrow 37) to the receiver 29 of the stream register unit 5 (arrow 38). Such a request can be initiated, for example, from C program code as an access to a volatile variable. Data is taken from the next location in the stream register FIFO 17 from which data should be taken, the FIFO 17 having received data from the VDC 4 as described previously. As explained above, data is forwarded automatically from the VDC FIFO 16 to the stream register FIFO 17 using the data, valid, taken signals, as described previously. In this case the stream register block 5 has received the data without delay, the VDC 4 having set high the data and valid signals (and sent the data item) to the stream register FIFO 17. Thus the load/store unit 28 of the CPU 2 receives the data item from the stream register FIFO 17 (arrow 40) and stores it temporarily in the register file 26 (arrow 42), from where the execution unit 27 can retrieve it (arrow 44).

This process is repeated for each of the n items of data, unless and until an item of data is not ready to be taken from the stream register FIFO 17. This eventuality is described in the following paragraph.

If a data item requested by the execution unit 27 of the CPU 2 is not in the next location in the stream register FIFO 17, the stream register 5 sends a stall signal to the execution unit 27 (arrow 46), thus causing the execution unit 27 to stall running of the program. If the data item remains unavailable and the execution unit 27 stalled for a predetermined time, the timeout generator 6 of the stream register unit 5 returns a TIMEOUT signal to the execution unit 27 (arrow 48). This signal tells the execution unit 27 that it can interrupt the program and perform other tasks. Therefore even though the program is stalled, the execution unit 27 of the CPU 2 is still capable of servicing interrupts and hence performance of the system 1 is maintained. It will be understood that the timeout generator 6 of the stream register block 5 operates in such a way that it has made the execution unit 27 stall before it becomes aware that it is not going to receive the data that it has requested. This is because the TIMEOUT signal 48 is sent in response to the execution unit 27 attempting to access the data from the register file 26. The danger of an irrecoverable stall is thus avoided.

The predetermined time after which the TIMEOUT signal is sent from the timeout generator 6 to the execution unit 27 is a programmable value, termed the "timeout constant".

When the data that the execution unit 27 has requested becomes available, the valid and data signals from the VDC 4 are switched high. This is in turn communicated across the communications channel 8 and data is transferred from the VDC FIFO 16 to the stream register FIFO 17. The stall signal from the stream register 5 to the execution unit 27 (arrow 46) is taken low to un-stall the execution unit 27.

The timeout is cleared explicitly by the interrupt program writing an instruction to the stream register unit 5 to clear the timeout signal. The interrupt program will write this instruction at a convenient point in the task being performed by the execution unit 27 during stalling of the program. Once the timeout signal has been taken low, running of the program continues.

If during this time the execution unit 27 has been interrupted to perform another task, any data is buffered in the stream register FIFO 17 ready for retrieval by the execution unit 27 at a later time. This continues until the stream register FIFO 17 becomes full, in which case it puts the taken signal to the communication channel 8 to logic low. This will prevent more data being sent from the VDC FIFO 16 to the stream register FIFO 17.

It will be understood by those skilled in the art that the above-described system is more efficient than some known systems for another reason, namely that it allows the availability of each data item to be tested individually. When a CPU is attempting to access peripheral data over a bus, it is usual to test blocks of data, which is more time consuming than the testing of a single data item as in the present system. The system also reduces bus traffic. It also avoids the need to write polling loops into the program, thus avoiding complexities in coding.

The above-described system works equally well with a number of FIFOs linked together in either or both of the VDC 4 or the stream register unit 5. This might be useful, for example, if the channel 8 needs to store some of the data which it is transferring. The above-described signals would simply be routed through the chain of FIFOs and the signals between the stream register block 5 and the execution unit 27 would remain the same. The data, valid and taken signals are augmented appropriately by each FIFO in the chain guaranteeing data ordering and integrity. It will be understood that the first embodiment described with respect to FIG. 1 would also function with a number of linked FIFOs.

The handshake signalling system described using FIFO data, valid and taken signals using logic level high for an active signal and logic level low for an inactive signal is not a requirement for operation of the invention. The invention would work equally well with other handshake mechanisms.

It will also be appreciated that a similar system could be used for the reverse situation, namely the CPU 2 writing data to the VDC 4. This would allow delays in writing of data to the VDC 4 caused by lack of memory space to be buffered from the CPU 2. In addition it would allow the CPU 2 to produce data at a different rate from that at which it is consumed by the VDC 4, without the need for complex circuitry.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A processing system for accessing data, the processing system comprising:
   a processor comprising an execution unit for executing instructions;
   a stream register unit being part of the processor and configured to supply a first type of data from a peripheral to the execution unit of the processor, the stream register unit including at least one stream register unit FIFO configured to store the first type of data received from the peripheral;
   a FIFO coupled to the peripheral to receive said first type of data from the peripheral and connected to the stream register unit by a communication path, along which said first type of data can be supplied from the FIFO coupled to the peripheral to the at least one stream register unit FIFO; and
   a memory bus, separate from the communication path, connected between a data memory and the processor, across which the processor can access a second type of data, the second type of data being randomly accessible data held in the data memory;

wherein the first type of data is supplied via the communication path directly from the FIFO coupled to the peripheral to the at least one stream register unit FIFO of the stream register unit of the processor and the second type of data is supplied via the memory bus, separate from the communication path, between the data memory and the processor; and wherein the stream register unit is configured to:
in response to a request for a data item from the execution unit, when the data item in located in a next location of the at least one stream register unit FIFO, provide the data item to the execution unit,
when the at least one stream register unit FIFO does not contain the data item in the next location,
request the data item from the FIFO coupled to the peripheral by setting a "taken" signal across the communication path to a logic high, and
when the FIFO coupled to the peripheral indicates that the data item is not available at the FIFO coupled to the peripheral by sending a "valid" signal set to a logic low, send a stall signal to the execution unit causing the execution unit to stop executing instructions.

2. The processing system according to claim 1, wherein data is supplied from the FIFO coupled to the peripheral to the stream register unit in accordance with requests for data made by the processor to the stream register unit and forwarded to the FIFO coupled to the peripheral.

3. The processing system according to claim 2, wherein the said requests are made as accesses to volatile variables.

4. The processing system according to claim 2, wherein the FIFO coupled to the peripheral is arranged to, upon receiving the request for data from the stream register unit, send a signal to the stream register unit indicating availability of the requested data.

5. The processing system according to claim 4, wherein if the FIFO coupled to the peripheral contains the requested data, the said signal to the stream register unit indicates that the data is available, and the FIFO coupled to the peripheral is further arranged to send a signal to the stream register unit comprising the data.

6. The processing system according to claim 5, wherein the stream register unit is arranged to, following receipt of the signal comprising the data, supply the data to the execution unit.

7. The processing system according to claim 5, wherein the stream register unit is arranged to, following receipt of the signal comprising the data, send a signal to the FIFO coupled to the peripheral indicating that the stream register unit has taken the data.

8. The processing system according to claim 7, wherein the said signal to the FIFO coupled to the peripheral further indicates a next location in the FIFO coupled to the peripheral from which data is required.

9. The processing system according to claim 4, wherein the FIFO coupled to the peripheral is further arranged to, if it does not contain the requested data, send a different signal to the stream register unit indicating that the data is not available.

10. The processing system according to claim 9, wherein the stream register unit is arranged to, if the signal sent by the FIFO coupled to the peripheral is the said different signal indicating that the data is not available, send the stall signal to the execution unit, causing the execution unit to stop executing the instructions.

11. The processing system according to claim 9, wherein the FIFO coupled to the peripheral is further arranged to, if following sending of the said different signal to the stream register unit the data subsequently becomes available, send a signal to the stream register unit indicating that the data is available, and to send a signal comprising the data to the stream register unit.

12. The processing system according to claim 9, further comprising a timeout generator arranged to, after a predetermined period of time has passed after the stall signal has been sent to the execution unit, send a timeout signal to the execution unit, causing the execution unit to interrupt such that it can execute other instructions.

13. The processing system according to claim 12, wherein, if following sending of the timeout signal to the execution unit the data subsequently becomes available, the timeout generator is arranged to receive an instruction instructing it to cease sending the timeout signal, and to, upon receipt of the said instruction, cease sending the timeout signal.

14. The processing system according to claim 12, wherein the stream register unit is arranged to, if following sending of the timeout signal to the execution unit the data subsequently becomes available, send the data to the execution unit.

15. The processing system according to claim 1, wherein the stream register unit is associated with a register file containing a plurality of registers and a load/store unit arranged to receive data from the stream register unit and temporarily store the data in the register file.

16. The processing system according to claim 15, wherein the execution unit is arranged to retrieve data from the register file.

17. The processing system according to claim 1, wherein data is supplied from the FIFO to the stream register unit in accordance with requests for data made by the processor to the stream register unit and forwarded to the FIFO, wherein the stream register unit is associated with a register file containing a plurality of registers and a load/store unit arranged to receive data from the stream register unit and temporarily store the data in the register file, wherein the execution unit is further arranged to make requests for data to the stream register unit via the load/store unit.

18. The processing system according to claim 1, wherein the stream register unit comprises a plurality of FIFOs connected to receive data from the FIFO coupled to the peripheral and supply the data to the execution unit.

19. The processing system according to claim 2, wherein the request for data is a request for a single data item.

20. The processing system according to claim 1, further comprising one or more additional FIFOs linked together between the said FIFO coupled to the peripheral and the communication channel.

21. The processing system according to claim 1, wherein the data from the peripheral is video data.

22. The processing system according to claim 21, wherein the peripheral is a video processing system.

23. A streaming data handling system, comprising:
a processor comprising an execution unit for executing instructions;
a stream register being part of the processor and configured to supply data from a peripheral to the processor, the stream register including at least one stream register FIFO configured to store the data received from the peripheral; and
a FIFO memory coupled to the peripheral to receive the data from the peripheral and connected to the least one stream register FIFO via a communication path, wherein the stream register and the FIFO memory operate the same data handling protocol such that the stream register can receive streamed data items from the FIFO memory and supply them to the processor in the received order, wherein the stream register is configured to:
in response to a request for a data item from the execution unit, when the data item in located in a next location of the at least one stream register unit FIFO, provide the data item to the execution unit, and when the at least one stream register unit FIFO does not contain the data item in the next location,
request the data item from the FIFO coupled to the peripheral by setting a "taken" signal across the communication path to a logic high, and when the FIFO coupled to the peripheral indicates that the data item is not available at the FIFO coupled to the peripheral by sending a "valid" signal set to a logic low, send a stall signal to the execution unit causing the execution unit to stop executing instructions; and a timeout generator arranged to, when the FIFO coupled to the peripheral sends, in response to a request for data from the stream register, a signal to the stream register indicating that the data is not available, after a predetermined period of time, send a timeout signal to the execution unit, causing the execution unit to interrupt such that it can execute instructions other than instructions requiring the data that is not available.

24. A stream register being part of a processor comprising an execution unit, the stream register being coupled between the execution unit and a peripheral and comprising:
a receiver arranged to receive a request for a data item from the execution unit; and
at least one FIFO configured to store the data item received from the peripheral; wherein the stream register is arranged to:
receive the request for the data item;
determine whether the requested data item is in the at least one FIFO;
when the requested data item is not in the at least one FIFO, send a stall signal to the execution unit of the processor;
send the request to the peripheral by setting a "taken" signal across a communication path between the peripheral and the at least one FIFO to a logic high and receive one or more signals back from the peripheral indicating availability of the requested data item;
when the data item is available, send the data item to the processor;
after a predetermined period of time, when the data item is not available and when the stall signal has been active for the predetermined period of time, send a timeout signal to the execution unit of the processor causing the processor to interrupt such that it can execute tasks other than the request; and
following sending of the timeout signal to the execution unit of the processor, if the data item subsequently becomes available, receive an instruction instructing it to cease sending the timeout signal, and to, upon receipt of the instruction, cease sending the timeout signal to the execution unit of the processor and temporarily store the data in the register file for access by the execution unit.

25. The stream register according to claim 24 further arranged to, if the data is available, temporarily store the data in a register file for access by the execution unit of the processor.

26. A stream register being part of a processor comprising an execution unit, the stream register being coupled between the execution unit and a memory, the stream register comprising:
a receiver arranged to receive a request for a data item from the execution unit of the processor; and
at least one FIFO configured to store the data item received from a peripheral;
wherein the stream register is arranged to:
receive the request for the data item;
determine whether the requested data item is in the at least one FIFO;
when the requested data item is not in the at least one FIFO, send a stall signal to the execution unit of the processor;
send the request to the memory and receive one or more signals back from the memory indicating availability of the requested data item; and
when the data item is available, send the data item to the execution unit of the processor;
after a predetermined period of time, when the data item is not available and when the stall signal has been active for the predetermined period of time, send a timeout signal to the execution unit of the processor causing the processor to interrupt such that it can execute tasks other than the request; and
following sending of the timeout signal to the execution unit of the processor, if the data item subsequently becomes available, receive an instruction instructing it to cease sending the timeout signal, and to, upon receipt of the instruction, cease sending the timeout signal to the execution unit of the processor and temporarily store the data in the register file for access by the execution unit.

* * * * *